Aug. 12, 1924.
H. C. EGERTON
1,504,547
PROCESS OF MOLDING HOLLOW ARTICLES
Original Filed April 16, 1919
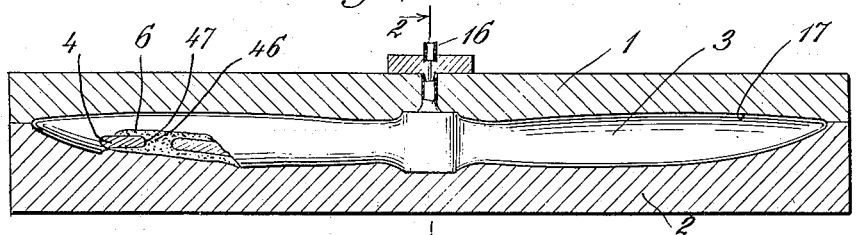
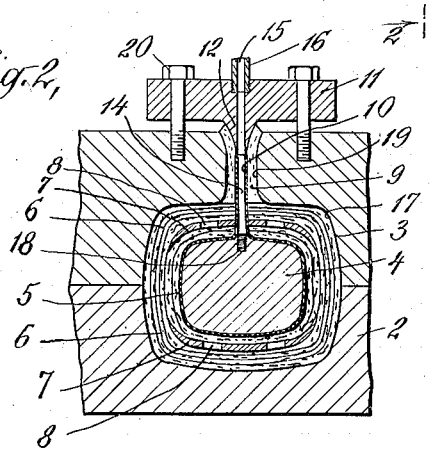
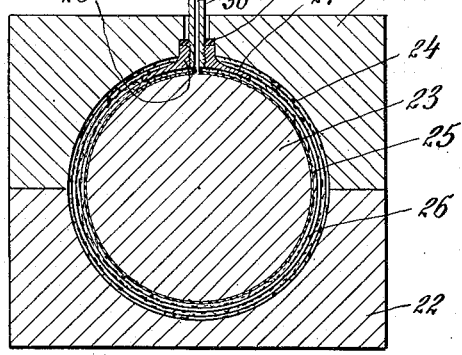
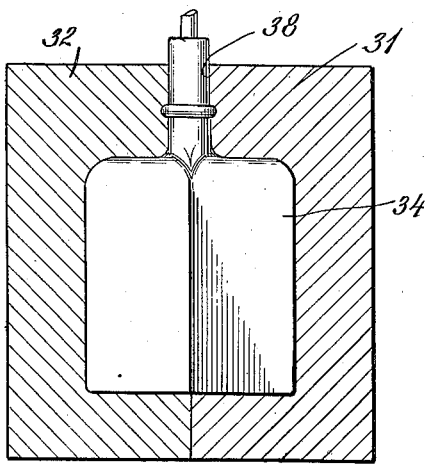
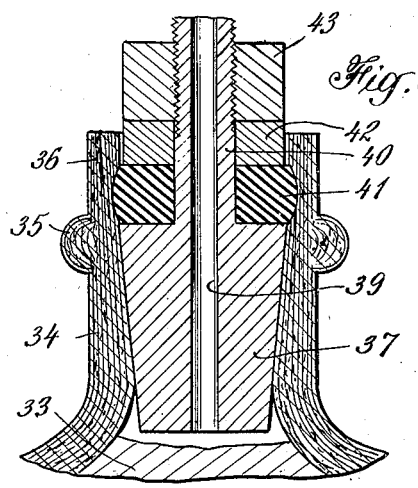
Inventor
Henry C. Egerton
By his Attorney
Harry L. Duncan Patented Aug. 12, 1924.

1,504,547

UNITED STATES PATENT OFFICE.

HENRY C. EGERTON, OF RIDGEWOOD, NEW JERSEY.

PROCESS OF MOLDING HOLLOW ARTICLES.

Application filed April 16, 1919, Serial No. 290,560. Renewed January 26, 1924.

*To all whom it may concern:*

Be it known that I, HENRY C. EGERTON, a citizen of the United States, and resident of Ridgewood, county of Bergen, State of New Jersey, have made a certain new and useful Invention Relating to Processes of Molding Hollow Articles, of which the following is a specification taken in connection with the accompanying drawing.

This invention relates especially to processes of molding hollow articles which may comprise fabric or other fibrous material carrying or impregnated with cured phenolic condensation type of cementing material. Such fibrous material as cotton batting, woven or knit cloth fabrics, paper, or the like, which is more or less impregnated with such cementing material in form of varnish so that it contains some thirty to sixty per cent or so of this cementing material by weight, may be formed or wound on a support or core of or comprising fusible material, such as fusible metal, waxy or resinous compositions which are sufficiently solid and rigid to assist in the shaping of this material which may be applied to or wound on the core in pieces, layers or strips of shaped fibrous material preferably after being sufficiently heated to be softened and rendered pliable. If desired, an elastic impervious facing may be formed on the fusible core or support before the fibrous material is applied to or wound thereon and metallic stiffening or reenforcing members may be incorporated in the fibrous material in some cases for additional strength or special purposes and especially if perforated may be thoroughly united to the fibrous material during the heat curing of the formed fibrous article blank. The article blank and core may be placed in a sectional curing mold formed with a shaped mold cavity and forced together under high hydraulic or other pressure sufficient to compress any projecting parts of the article blank. Then high fluid pressure may be exerted within or adjacent the core by connecting therewith a source of hydraulic fluid pressure at a number of hundred pounds per square inch so as to act within the article blank or the impervious more or less elastic facing formed within the same and force the article strongly outward against the mold cavity during the heat curing process which compresses and compacts the successive layers or portions of the fabric or fibrous material which is thus cured under such conditions as to secure great strength of union.

In the accompanying drawing showing in a somewhat diagrammatic way various illustrative forms of apparatus for carrying out this process.

Fig. 1 is a sectional view of a molding device.

Fig. 2 is a transverse sectional view thereof taken substantially along the line 2—2 of Fig. 1.

Fig. 3 is a sectional view showing another form of mold and the article which may be formed therein.

Fig. 4 shows still another arrangement of mold; and

Fig. 5 is an enlarged sectional detail thereof showing the sealing of the article blank against the mold walls.

The sectional or other curing mold which may have the cooperating parts 1, 2 adapted to be forced together and held tightly in position by any suitable means may be formed with a cooperating molding cavity 17 of such shape and size as to form the desired article such as an aeroplane propeller diagrammatically indicated in Fig. 1. As shown more in detail in the enlarged transverse section, Fig. 2, the mold cavity 17 may be so shaped as to promote the withdrawal of one or both sections of the mold from the completed article and the mold may be formed with a projecting pressure opening 19 through which gaseous, liquid or other pressure of the desired number of pounds per square inch can be exerted within the article blank during the heat curing thereof. The article blank is preferably formed on a substantially rigid or solid core, such as 4, which is given such shape and size as substantially corresponds to the desired internal cavity within the completed article. This core may be formed of any suitable fusible metal or material which can be melted and withdrawn from the completed article in such completely or partly melted condition after the heat curing of the cementing material employed without undesirably heating or injuring the completed article. For this purpose many fusible metal compositions, such as Rose's metal, which may be formed of two parts of bismuth, one part of lead, one part of tin, or an equal part mixture of lead and bismuth or the higher melting lead, tin, bismuth alloys, may be used for this purpose and formed into the desired substantially rigid core by suitable casting or other processes before the fabric or fibrous material is applied to or wound on the core and heat cured to form the hollow article desired.

For some purposes where it is desired to secure a hollow article in substantial balance it is possible to form such a fusible core of metal or resinous waxy material and then balance the core about the axis of rotation of a propeller blade, for example. Then after the successive layers or pieces of fabric or fibrous material have been applied to or wound on the core to form the article blank of the desired size and thickness of wall, the completed article blank and core may again be balanced and the balance adjusted by removal of such parts of the material from various parts of the article as seem desirable before the curing process forms the complete article in final form. It is of course understood that where such stiff, strong, fusible metal cores are employed the successive layers of impregnated fabric or other fibrous material wound on or applied to the core may be successively smoothed down or forced against the adjacent layers by heat pressing devices, such as heated pressure rolls, etc. which promotes the closeness and strength of union of the different layers. For some purposes it is desirable to form a more or less elastic impervious facing on the core or support before applying the fibrous material thereto and as shown in Fig. 2 a facing 5 of this character may be formed on the metal or other fusible core 4 by applying a vulcanized rubber layer or by winding one or more layers of vulcanized cloth or fabric thereon in such a way as to form an impervious facing or layer of sufficient elasticity to allow the expansion necessary during the curing of the article. Of course any rubber or other equivalent composition may be used for such an impervious facing, a good material being light muslin or other fabric having on one side a cured vulcanized rubber coating while the other side is coated with a frictioned or other coating of unvulcanized rubber to secure greater adhesion to the adjacent layers or material.

The layers or pieces of fabric or fibrous material 6 may be wound around or applied to the core or facing thereon so as to form an article blank 3 of such size and thickness as is desired so that this built up material 6 has the desired thickness of wall at various parts of the article blank. If desired also occasional or separated reenforcing or bracing members may be advantageously used in such aeroplane propellers or other struts or devices subject to bending strains and as shown in the partial sectional portion of Fig. 1 any desired number of reenforcing bracing members as 46 may be incorporated in various parts of the article so as to connect the fibrous wall 6 thereof and give greatly increased rigidity to the hollow article at this point. For this purpose any desired number of holes or apertures 47 may be formed in the metallic or other core 4 and blocks, strips or other previously shaped and more or less compressed pieces of impregnated fabric or fibrous material may be inserted in them, or successive layers of fabric or impregnated fibrous material may be wound through these holes as the article blank is built up so that effective union of the parts is secured during the curing and molding operation. Previously formed blocks or strips should of course be given such extra length as causes effective compression thereof or of the adjacent fabric when the molds are closed together which is often sufficient to secure the effective union of these parts when the phenolic condensation cementing material they contain is cured. And in some cases perforated or other sheet steel or metallic reenforcing stiffening members, such as 7, having the holes 8 therein may be incorporated in the cloth or paper fabric or other sheeted fibrous material as it is applied to the core, this metallic reenforcing material preferably being of such size, shape and composition as to permit the radial expansion or movement of the fibrous material during the pressure curing thereof. As this material is built up a pressure passage 14 is preferably formed in the fibrous material as by screwing a mandrel into the threaded hole 18 which may be formed in the core and building up around this mandrel an impervious elastic facing 10 and a fibrous pressure connection 9 of similar impregnated fibrous material united with the fibrous layers or material of the article blank in an intimate manner. When the article blank is completed this mandrel which may of course be used for balancing purposes may be unscrewed or otherwise withdrawn leaving a pressure passage or opening 19 in the mold as indicated in Fig. 2. When the mold is forced, clamped or otherwise forcibly closed together, this pressure connection 9 may be sealed to a cooperating pressure pipe or passage and also, if desired, to the adjacent walls of the curing mold as by forcing in a conical or tapering sealing member 12 into the outer end of this pressure connection which tightly engages the inner portion thereof, or the impervious facing 10 which may be formed therein, and forces this somewhat yielding material which is preferably warmed or slightly heated at this time out against the walls of the mold so as to tightly seal the same and form a continuous pressure passage 15 extending from the pipe 16 through the clamping member 11 which may of course be bolted in place as by the bolts 20. When these parts have been adjusted the sectional mold may be heated in any desired way to the proper curing temperature for the particular phenolic condensation cementing material employed which with dried phenolic condensation varnish compositions may advantageously be 300° to 320° Fahrenheit when the curing time is twenty to sixty minutes more ore less, depending, of course, on the thickness of wall used in the article blank and other conditions. Of course where the article blank is of varying thickness at different parts it is advantageous to graduate the heat of the mold accordingly, so that as in the case of an aeroplane propeller where the hub or central portions thereof are relatively thick to secure added strength, this part of the mold may be more highly heated as by supplying more of the heat from this central part of the mold through steam, gas or other heating devices, while the outer ends where the blank has thinner walls may be heated to a less temperature or for a shorter time. This is of course dependent to some extent on the material and character of the core used, since a fusible metallic core requires considerable heat to bring it up to the curing temperature necessary to ensure the complete or proper curing of the inner layers of the fibrous material next the core, while where a waxy or resinous fusible core is used considerably less heat is required to bring up the core temperature. When the article blank and core are clamped within the mold and the pressure connection sealed and the blank is sufficiently heated so that the fabric or other fibrous material is substantially softened internal fluid pressure may advantageously be exerted within the blank as by supplying hydraulic or other liquid or gaseous pressure through the pressure pipe 15 and communicating pressure connection so that a substantially uniform pressure of a number of hundred pounds per square inch may be exerted within the article blank or impervious facing. This pressure of course forces the article blank sufficiently away from the core to penetrate along the core and more or less uniformly force all the parts of the article blank outward toward or against the molding cavity which may strongly compress the layers of fabric or other fibrous material during the heat curing of the incorporated phenolic condensation cementing material which converts it into the strong solid form of the phenolic condensation product or other material used, to strongly unite the fibrous material and secure the consolidation thereof which is desirable for greatest strength in such cured fabric. Of course where such readily fusible metals are used as above indicated the core may partly or completely melt during the curing operation, although where a less fusible composition is chosen the core may remain in substantially solid condition during the normal curing and then after the curing has been entirely or practically completed the heat may be raised slightly to say 350° Fahrenheit more or less to melt the core and make it possible to remove the same from the mold as through the pressure opening or openings employed. In this way the core may be maintained in substantially solid rigid condition throughout at least the first part of the curing of the material which is sometimes advantageous.

Various other articles may be made in this general way by building them up around fusible metallic or other cores or supports and as shown in Fig. 3 a spherical or other hollow article, such as a float ball or device, may be formed within the molding cavity 24 in the sectional mold 21, 22. A fusible metal or other core 23 may be used in this case and may have a rubberized or other impervious more or less elastic facing 25 formed thereon before the successive layers of fabric or other fibrous material 26 coated or impregnated with such phenolic condensation cementing material are wound on or otherwise applied or formed around the core so as to form the desired article blank. In some cases metallic members such as the connector boss or support 28 may be incorporated in the article and this boss or member may have a relatively thin perforated or other flange 27 which may be interposed between the layers of fabric or other fibrous material so as to leave the threaded or other boss 28 protruding therefrom to the desired extent in the completed uncured article blank. This makes it possible to readily connect a pressure connection or pipe such as 30 to the article blank as by screwing it into the threaded hole in this boss which may make a tight connection therewith especially if such a rubber or other washer as 49 is interposed between these parts. The article blank and core may be inserted within the mold before or after this pressure connection is made and after closing and clamping the mold sections together they may be heated to the desired curing temperature and the high curing pressure simultaneously applied within the article by admitting hydraulic fluid or liquid, which may be heated in some such cases, through the aperture 29 in the pressure pipe 30. This fluid thus passes through the pressure hole 28 in the article blank so as to penetrate around the core inside the rubberized or other impervious facing which may be provided and exert substantial uniform compressive action on the fibrous material of the article blank during its heat curing treatment.

Bottles or other containers or chemical vessels or apparatus may in many cases be conveniently formed in this way and as indicated in Fig. 4 a bottle may be molded in this manner so as to form a tough and strong article which is desirable for use with some corrosive or special chemicals. The mold sections 31, 32 may be formed with a molding cavity and the article blank having the desired number of layers of fabric or fibrous material 34 may be formed around the fusible metallic or other core 33 so as to have the desired thickness of wall throughout various parts of the article. In this case the pressure connection may be of such character as to simultaneously form a tapered cork hole in the completed article as is shown more in detail in Fig. 5. The pressure connection may have a conical end 37 formed with the pressure hole 39 for the pressure fluid and this conical end may be strongly forced or wedged into the bottle neck after the blank has been placed in the metal so as to force this part of the article outward against the mold cavity and simultaneously compress the walls at this part of the container which may be formed with an extended lip 35 and with an upper sealing extension 36, if desired. A rubber or other sealing washer 41 may be provided on this sealing connection and may be forced outward by the longitudinal pressure exerted thereon by the bushing 42 and nut 43 which may be screwed onto the threaded end of this connection indicated and held in longitudinal position with respect to the mold during the curing operation by any desired means. This gives a convenient pressure connection with the interior of the article blank and when the mold has been brought up more or less to curing heat high pressure may thus be exerted within the article so as to work around the core and more or less uniformly force different parts of the article out against the mold cavity during the heat curing of the incorporated phenolic condensation cementing material. Of course in some cases the heat expansion action of the fusible metal core may be relied on in whole or in part to secure the desired outward compression of the article blank against the molding cavity and the fusible metal composition may in some cases be so chosen as to secure this result.

For some purposes it is advantageous to use as reinforcing or bracing members such as 46 in the Fig. 1 article special highly compressed pieces of fibrous material carrying large proportions of phenolic condensation cementing material, and hollow or other shaped sectional pieces of this general character may be advantageously formed by extrusion processes in many instances by which lengths of highly compressed material containing forty to sixty per cent more or less of cotton, linen, or other fibre preferably of rather short uniform length is used coated, incorporated and cemented together with the more or less cured phenolic condensation cementing material. Such fibrous material preferably of more or less uniform length may be incorporated with phenolic condensation cementing material of this character as in mixing machines in which varnish or other composition may be thoroughly mixed with the fibre and then the coated or cemented fibrous material may be dried and compacted or compressed preferably to remove practically all of the air therefrom and this may be done by pressing rolls feeding the strip or layer of cemented fibrous material into a press in which, if desired, compressed partly cured blanks of such cemented fibrous material may be formed and cured of standard size and to a sufficient extent to retain them in this compressed condition convenient for insertion in an extrusion press of any suitable character. The extrusion of such material may be effected under high extrusion pressure and moderate heat sufficient to at least partly soften the cementing material which may sometimes have a few percent of anilin or other softening agent to make the nearly cured composition more readily weldable or unitable under high pressure. Such material when somewhat heated may be forced through an extrusion die to form the desired hollow or other sectioned partly cured extruded article which may be subsequently heated for further curing while still under pressure due to the extrusion operation, the article being preferably cooled before being completely released from this pressure. Such articles may be in partly cured condition for incorporation with such composite hollow articles as above described or they may be completely cured during extrusion or thereafter in suitable pressure chambers at temperatures of 250° or 300° Fahrenheit.

This invention has been described in connection with a number of illustrative embodiments, devices, materials, proportions, parts, forms, times, temperatures, conditions, and orders of steps, to the details of which disclosure the invention is not of course to be limited, since what is claimed as new and what is desired to be secured by Letters Patent is set forth in the appended claims:

1. The process of molding and curing hollow articles comprising cloth fabric carrying incorporated phenolic condensation cementing material, which comprises forming a substantially rigid solid core of fusible metallic material, incorporating with said fusible core a communicating pressure connection, winding and arranging thereon layers of cloth and paper carrying dry phenolic condensation cementing material and a metallic stiffening member until the article blank has substantially the desired size and thickness of walls, compressing said blank and core in a substantially rigid sectional curing mold, heating the blank and core and subjecting said core to high fluid pressure to force the layers of fabric together and outward against the mold cavity during the heat curing of the cementing material and melting and removing said fusible core.

2. The process of molding hollow articles comprising fabric carrying incorporated phenolic condensation cementing material, which comprises forming a substantially rigid solid core of fusible material, incorporating with said fusible core a communicating pressure connection, winding and arranging thereon layers of fabric carrying dry phenolic condensation cementing material and a metallic stiffening member until the article blank has substantially the desired size and thickness of walls, compressing said blank and core in a substantially rigid sectional curing mold, heating the blank and subjecting said core to high fluid pressure to force the layers of fabric together and outward against the mold cavity during the heat curing of the cementing material and melting and removing said fusible core.

3. The process of molding hollow articles comprising fabric carrying incorporated phenolic condensation cementing material, which comprises forming a substantially solid core of fusible material, winding and arranging thereon layers of fabric carrying dry phenolic condensation cementing material and a metallic stiffening member until the article blank has substantially the desired thickness of walls, compressing said blank and core in a substantially rigid sectional curing mold, heating the blank and subjecting said core to high fluid pressure to force the layers of fabric together and against the mold cavity during the heat curing of the cementing material and melting and removing said fusible core.

4. The process of molding hollow articles comprising fibrous material and incorporated phenolic condensation cementing material which comprises forming a readily fusible substantially solid metallic core, forming on said core a substantially impervious elastic facing layer comprising rubber, applying successive layers of fibrous material carrying incorporated phenolic condensation cementing material to said core to form an article blank, placing said article blank and core within a curing mold having a shaped molding cavity and sealing to said mold the walls of a pressure passage formed in said article blank, heating said mold and article blank and exerting high fluid pressure within said facing to force said article blank out against the molding cavity during the heat curing of the phenolic condensation cementing material and melting and removing said core from the cured article.

5. The process of molding hollow articles comprising fibrous material and incorporated phenolic condensation cementing material which comprises forming a readily fusible substantially solid core, forming on said core a substantially impervious elastic facing layer applying successive layers of fibrous material carrying incorporated phenolic condensation cementing material to said core to form an article blank, placing said article blank and core within a curing mold having a shaped molding cavity and sealing a pressure passage formed in said article blank, heating said mold and article blank and exerting high fluid pressure within said facing to force said article blank out against the molding cavity during the heat curing of the phenolic condensation cementing material and melting and removing said core from the cured article.

6. The process of molding hollow articles comprising fibrous material and incorporated phenolic condensation cementing material which comprising forming a readily fusible substantially solid core, forming on said core a substantially impervious facing layer, applying fibrous material carrying incorporated phenolic condensation cementing material to said core to form an article blank, placing said article blank and core within a curing mold having a shaped molding cavity, heating said mold and article blank and exerting high fluid pressure within said facing to force said article blank out against the molding cavity during the heat curing of the phenolic condensation cementing material and removing said core from the cured article.

7. The process of molding hollow articles comprising fibrous material and incorporated phenolic condensation cementing material which comprises forming a fusible substantially solid core, forming on said core a substantially impervious facing layer, applying and winding on around said core successive layers of fibrous material and incorporated phenolic condensation cementing material to form an article blank, placing said article blank and core within a curing mold having a shaped molding cavity, heating said mold and article blank and exerting high fluid pressure within said facing to force said article blank out against the molding cavity during the heat curing of the phenolic condensation cementing material, cooling said molded article within said mold and melting and removing core material from the cured article.

8. The process of molding hollow articles formed of a plurality of layers of fabric or other fibrous material carrying incorporated phenolic condensation cementing material, which comprises winding the article on a core and securing to the inner surface thereof an impervious facing of fabric carrying vulcanized rubber, inserting the article in a sectional mold having a shaped molding cavity and sealing a portion of the article against the mold and applying heat to the mold and simultaneously exerting high fluid pressure against the inside of the article to strongly force it against the molding cavity and compress the different portions of the article while the phenolic condensation cementing material therein is being cured.

9. The process of molding hollow articles formed of a plurality of layers of fabric or other fibrous material carrying incorporated phenolic condensation cementing material, which comprises winding the article on a core and securing to the inner surface of the article an impervious facing, inserting the article and core in a mold having a shaped molding cavity and sealing by yieldable sealing means an open end of the article against the mold and heating the mold and exerting high fluid pressure against the inside of the article to strongly force it against the molding cavity and compress the different portions of the article while the phenolic condensation cementing material therein is being cured.

10. The process of molding hollow articles formed of a plurality of layers of woven fabric carrying incorporated phenolic condensation cementing material which comprises forming the article on a core and forming on the inner surface thereof an impervious facing comprising vulcanized rubber, inserting the article and core in a mold having a shaped molding cavity and sealing an open portion of the article, heating the mold and exerting high fluid pressure against the inside of the article to strongly compress the different portions of the article and force the article against the molding cavity while the phenolic condensation cementing material therein is being cured and venting said molding cavity.

11. The process of molding hollow articles comprising fibrous material and incorporated phenolic condensation cementing material which comprises forming a readily fusible substantially rigid core forming on said core a substantially elastic facing layer comprising rubber, applying successive layers of fibrous material carrying phenolic condensation cementing material to said core to form an article blank, placing said article blank and core within a curing mold having a shaped molding cavity, heating said mold and article blank and exerting high fluid pressure on said article blank during the heat-curing of the phenolic condensation cementing material and melting and removing said core from the cured article.

12. The process of molding hollow articles comprising fibrous material and incorporated phenolic condensation cementing material which comprises forming a readily fusible core forming on said core a substantially elastic facing layer, applying fibrous material carrying phenolic condensation cementing material to said core to form an article blank, placing said article blank and core within a curing mold having a shaped molding cavity, heating said mold and article blank and exerting pressure on said article blank during the heat curing of the phenolic condensation cementing material and removing said core from the cured article.

13. The process of forming a balanced article comprising fibrous material and incorporated cured phenolic condensation cementing material which comprises forming a core of readily fusible material and balancing said core, applying to said core an impervious rubber facing and a plurality of layers of fibrous material carrying substantially dried phenolic condensation cementing material to form an article blank and balancing said article blank and core, inserting said article blank and core into a curing mold having a shaped molding cavity and exerting high fluid pressure on the inside of said article blank to compress the layers of said article blank and force the same against said molding cavity during the heat curing of said phenolic condensation cementing material and melting and removing said core.

14. The process of forming articles comprising fibrous material and incorporated cured phenolic condensation cementing material which comprises forming a core of readily fusible material and balancing said core, applying to said core a plurality of layers of fibrous material carrying substantially dried phenolic condensation cementing material to form an article blank and balancing said article blank and core, inserting said article blank and core into a curing mold having a shaped molding cavity and exerting high fluid pressure on the inside of said article blank to compress the layers of said article blank and force the same against said molding cavity during the heat curing of said phenolic condensation cementing material and removing said core.

15. The process of molding and curing hollow articles comprising fibrous material carrying incorporated phenolic condensation cementing material, which comprises inserting in the perforations of a perforated fusible core and arranging thereon layers of fibrous material carrying dry phenolic condensation cementing material until the article blank has substantially the desired size and thickness of walls, compressing said blank and core in a substantially rigid sectional curing mold and heating the blank and core and subjecting said core to high fluid pressure to force the layers of fabric together and outward against the mold cavity during the heat curing of the cementing material, and form limited bracing portions in said perforations and melting and removing said core.

16. The process of molding and curing hollow articles comprising fibrous material carrying incorporated phenolic condensation cementing material, which comprises inserting in the perforations of a perforated fusible core and arranging thereon layers of fibrous material carrying dry phenolic condensation cementing material until the article blank has substantially the desired size and thickness of walls, compressing said blank and core in a sectional curing mold and heating the blank and core to force the layers of fabric together and outward against the mold cavity during the heat curing of the cementing material and form limited bracing portions in said perforations and removing said core.

17. The process of molding hollow articles formed of fibrous material carrying phenolic condensation cementing material which comprises forming the article, inserting the article in a sectional mold having a shaped molding cavity and exerting high fluid pressure against an impervious yieldable molding facing member and pressing the same against the inside of the article to strongly force the article against the mold and compress the portions of the article while the phenolic condensation cementing material therein is being heat cured and transformed into hard solid condition.

18. The process of molding hollow articles comprising fibrous material and incorporated phenolic condensation cementing material which comprises, applying fibrous material carrying incorporated phenolic condensation cementing material to substantially solid fusible core to form an article blank having walls of varying thickness, placing said article blank and core within a curing mold having a shaped molding cavity, heating said mold and article blank to different extents in proportion to the thickness of said article blank.

19. The process of molding articles comprising fibrous material and incorporated phenolic condensation cementing material which comprises forming an article blank comprising fibrous material carrying incorporated phenolic condensation cementing material and having varying thickness, placing said article blank within a curing mold having a shaped molding cavity, heating said mold and article blank to different extents in proportion to the thickness of said article blanks.

20. The process of molding and curing hollow plastic articles comprising fibrous material and incorporated phenolic condensation cementing material which comprises applying a substantially impervious elastic facing layer comprising rubber on a fusible substantially solid core, applying fibrous material carrying incorporated phenolic condensation cementing material to said core and within perforations in said core to form an article blank, placing said article blank and core within a curing mold having a shaped molding cavity, heating said mold and article blank and exerting high fluid pressure on said facing to force said article blank out against the molding cavity and form internal connecting portions of said article within the core perforations during the heat curing of the phenolic condensation cementing material and melting and removing said core from the cured article.

21. The process of molding and curing hollow plastic articles comprising fibrous material and incorporated phenolic condensation cementing material, which comprises applying such material on a fusible substantially solid core and within perforations in said core to form an article blank having internal connecting portions extending through said perforations between the opposite sides of said article blank, placing said article blank and core within a curing mold having a shaped molding cavity, heating said mold and article blank and exerting high fluid pressure to force said article blank out against the molding cavity and form internal connecting portions of said article within the core perforations during the heat curing of the plastic material and melting and removing said core from the cured article.

HENRY C. EGERTON.